(12) United States Patent
Merz et al.

(10) Patent No.: US 9,285,576 B2
(45) Date of Patent: Mar. 15, 2016

(54) STEREOSCOPIC MICROSCOPE

(71) Applicants: Franz Merz, Aalen (DE); Artur Hoegele, Oberkochen (DE)

(72) Inventors: Franz Merz, Aalen (DE); Artur Hoegele, Oberkochen (DE)

(73) Assignee: CARL ZEISS MEDITEC AG, Jena (DE)

( * ) Notice: Subject to any disclaimer, the term of this patent is extended or adjusted under 35 U.S.C. 154(b) by 158 days.

(21) Appl. No.: 13/854,278

(22) Filed: Apr. 1, 2013

(65) Prior Publication Data
US 2013/0265637 A1  Oct. 10, 2013

(30) Foreign Application Priority Data
Apr. 3, 2012 (DE) .......................... 10 2012 006 749

(51) Int. Cl.
G02B 21/22 (2006.01)
(52) U.S. Cl.
CPC ...................................... *G02B 21/22* (2013.01)
(58) Field of Classification Search
CPC ................................ G02B 21/36; G02B 21/02
USPC .................. 359/372–380, 432, 362–363, 369
See application file for complete search history.

(56) References Cited

U.S. PATENT DOCUMENTS

| 4,525,042 | A |   | 6/1985  | Muchel            |         |
|-----------|---|---|---------|-------------------|---------|
| 4,938,575 | A |   | 7/1990  | Kleinberg et al.  |         |
| 5,132,837 | A |   | 7/1992  | Kitajima          |         |
| 5,140,458 | A | * | 8/1992  | Takagi et al.     | 359/380 |
| 5,287,219 | A |   | 2/1994  | Hildebrand et al. |         |
| 5,668,661 | A |   | 9/1997  | Tomioka           |         |
| 5,701,196 | A | * | 12/1997 | Nakamura          | 359/362 |
| 5,856,883 | A | * | 1/1999  | Sander            | 359/389 |
| 6,320,702 | B1|   | 11/2001 | Yonezawa          |         |
| 2008/0266657 | A1 | * | 10/2008 | Strahle et al. | 359/376 |

(Continued)

FOREIGN PATENT DOCUMENTS

| CN | 1143194 A    | 2/1997  |
|----|--------------|---------|
| DE | 32 02 075 A1 | 8/1983  |
| DE | 40 12 552 A1 | 10/1991 |

(Continued)

OTHER PUBLICATIONS

Chinese Office Action in corresponding Chinese Application No. 201310185070.4 issued Jun. 4, 2015.

(Continued)

*Primary Examiner* — Stephone B Allen
*Assistant Examiner* — Rahman Abdur
(74) *Attorney, Agent, or Firm* — Patent Portfolio Builders PLLC

(57) ABSTRACT

A stereoscopic microscopic providing at least one pair of stereoscopic optical paths comprises an objective system, a first focusing lens having a first optical refractive power and a second focusing lens having a second optical refractive power and at least one actuator. The first optical refractive power and the second optical refractive have different signs. The objective system and the first and second focusing lenses are commonly traversed by the at least one pair of stereoscopic optical paths, respectively. The actuator shifts at least one of these first and second focusing lenses along the at least one pair of stereoscopic optical paths to change the working distance and/or to vary an optical refractive power of at least one of these first and second focusing lenses. The first focusing lens is immediately neighboring the objective system along the at least one pair of stereoscopic optical paths.

29 Claims, 6 Drawing Sheets

(56) References Cited

U.S. PATENT DOCUMENTS

2008/0278800 A1* 11/2008 Widmer ..................... 359/376
2009/0059363 A1    3/2009 Straehle et al.

FOREIGN PATENT DOCUMENTS

| DE | 43 31 635 C2 | 6/1994 |
| DE | 295 05 775.0 U1 | 7/1995 |
| DE | 101 34 896 A1 | 4/2002 |
| DE | 10 2005 050 171 A1 | 4/2007 |
| EP | 0 464 236 A1 | 1/1992 |
| WO | 88/04786 A1 | 6/1988 |
| WO | 2007/101695 A1 | 9/2007 |

OTHER PUBLICATIONS

Office Action issued in corresponding German patent application No. 10 2012 006 749.6, dated Nov. 15, 2012.

* cited by examiner

STEREOSCOPIC MICROSCOPE

CROSS-REFERENCES TO RELATED APPLICATIONS

This application claims priority of Patent Application No. 10 2012 006 749.6, filed Apr. 3, 2012 in Germany, the entire contents of which are incorporated by reference herein.

FIELD

The present disclosure relates to a stereoscopic microscope.

A stereoscopic microscope provides at least one pair of (observation) optical paths for observing an object that can be placed in an object plane of the stereoscopic microscope. The at least one pair of optical paths is guided by optical elements of the microscope in a way such that they intersect in the object plane (plane were the object to be observed can be located)/focal plane (plane were a focus of the optical elements of the microscope guiding the at least one pair of optical paths is located) including a stereoscopic angle of typically between 6° and 18°. Both optical paths image the object plane from slightly different views/directions in a two dimensional way in enlarged scale, such that a two dimensional image is obtained. A stereoscopic microscope can be used as a surgical microscope, for example. Adaptation to changing working distances (focusing) is frequently performed in stereoscopic microscopes by shifting a group of optical lenses traversed by the at least one pair of optical paths.

BACKGROUND

In addition to a main observer tube (tube used by a main observer/main user of the microscope), a co-observer tube (assistant observer tube) and thus a tube that may be used by a second observer, is frequently provided in surgical microscopes. Such a system is described in German patent application DE 43 31 635 C2 of the applicant and shown in FIG. 4, for example. As shown in FIG. 4, two pairs of stereoscopic (observation) optical paths entering the surgical microscope from a side where the observed object is to be located firstly traverse commonly (together and in the same direction) an object lens 3* and then are guided by a mirror arrangement 4* selectively to a main observer tube 2* or a co-observer tube 1*. Main observer tube 2* and co-observer tube 1* respectively comprise a system bending the respective pair of optical paths 2.1*, 1.2* and a pair of oculars 2.1* and 1.1*. Two focusing lenses 5a* and 6a* that are traversed by the optical paths of one pair of optical paths in sequence are located in the co-observer tube 1*. The optical paths, respectively, are guided separately by the focusing lenses, such that each focusing lens is only traversed by one single optical path of the pair of optical paths. Via the objective lens 3* and the focusing lens 5a* arranged closer to the object (and the objective lens 3*) than the other focusing lens 6a*, an object arranged in the object plane is imaged into a first intermediate image 7* located between the focusing lenses 5a* and 6a* for each optical path of the at least one pair of optical paths. These first intermediate images 7* are imaged into second intermediate images, which are located in a region of the system bending the optical paths 1.2* of the co-observer tube 1*. These second intermediate images are imaged by the oculars 1.1* of the co-observer tube 1*, respectively, in enlarged scale to the retina of an observer (namely the co-observer). An adaptation of a working distance of the co-observer tube 1* independently of the main observer tube 2* is possible by shifting one of the two focusing lenses 5a*, 6a*. However, if no appropriate correcting measure is taken, shifting of one of the two focusing lenses 5a*, 6a* results in a lateral drift of the intermediate images in a plane were the intermediate images are located, which plane is located in between the two focusing lenses 5a* and 6a*, and thus to a tilting of the stereoscopic optical axes. When the plane in which the field of view of a co-observer is located, is located above the focal plane of the main observer, the intermediate images observed by the co-observer drift inwardly towards one another, which requires a convergent eye position of the co-observer. When the plane observed by the co-observer is located below the focal plane of the main observer, the intermediate images observed by the co-observer drift outwardly and thus away from each other, resulting in a divergent eye position of the co-observer.

German Utility Model DE 295 05 755 U1 proposes a solution to the above problem of a convergent respectively divergent eye position of the co-observer. According to this document, an optical system of variable back focal length is proposed. The optical system has a main objective of constant focal length and at least two groups of lenses that are arranged in sequence to the main objective in the stereoscopic partial optical paths and are shiftable along the optical axis for variable adaptation of the back focal length and focal length. Upon shifting of at least one of the two groups of lenses in the stereoscopic partial optical paths along the optical axis, a simultaneous displacement of the group of lenses in a direction orthogonal to its optical axis is performed. The two groups of lenses in the stereoscopic partial optical paths are each designed as achromats, respectively separately corrected with respect to aberrations.

It is a disadvantage of known stereoscopic microscopes that, upon focusing, either a drift of the intermediate images imaged in the optical paths occurs, resulting in an uncomfortable situation for a user, or a high effort is necessary regarding optical components, respectively, mechanical components, to avoid such a drift of the intermediate images.

SUMMARY

Embodiments of the present disclosure relate to a stereoscopic microscope with an objective system and a focusing optics, which stereoscopic microscope provides for a relaxed and comfortable observation of an object even in different focal planes (different planes where the respective focus is located).

According to embodiments, a stereoscopic microscope having optical elements for defining at least one pair of stereoscopic (observation) optical paths comprises an objective system, a first focusing lens having first optical refractive power (refractive power=reciprocal of focal length) and a second focusing lens having a second optical refractive power, and at least one actuator. The first focusing lens and the second focusing lens each are separate elements separated from one another along the optical axes of the stereoscopic optical paths.

According to this document, an objective system is a lens system that is located along the optical paths of the stereoscopic microscope closest to a position where an object to be observed is located, the lens system having an optical refractive power adapted for imaging an object placed in an object plane to infinity. Thus, the objective system provides an afocal interface at a side along the optical paths of the stereoscopic microscope opposite to the side where the observed object is placed. The objective system can be one single optical lens or an optical system consisting of several elements. In this respect, the objective system can consist of one or plural basic optical lens elements and/or cemented lenses and/or optical elements of variable optical refractive power such as liquid lenses, or liquid crystal lenses.

The pairs of stereoscopic optical paths are guided in the stereoscopic microscope in a way that axes of each pair of optical paths respectively intersect in the object plane including a stereoscopic angle. The stereoscopic angle can be between 6° and 18° and especially between 8° and 16°. According to an embodiment, the objective system is one single cemented lens. According to an alternative embodiment the objective system can be one single basic lens element. The objective system is traversed commonly by all optical paths of the at least one pair of stereoscopic optical paths. The optical path of each pair of stereoscopic optical paths can either partially overlap in the objective system or not overlap. The objective system can have a constant or variable optical refractive power. When the objective system has a variable optical refractive power, the objective system can have plural optical lenses that are sequentially traversed by the at least one pair of stereoscopic optical paths and an actuator, which is adapted to shift one or plural optical lenses of the objective system along the optical axis of the at least one pair of stereoscopic optical paths. According to an embodiment this shift of lenses of the objective system causes a displacement of the lenses of the objective system relative to one another. Alternatively, or additionally, the objective system can comprise an optical element of variable optical refractive power for adapting the focal length.

The two focusing lenses are arranged immediately neighboring the objective system along the optical axes of the at least one pair of stereoscopic optical paths and are commonly traversed by the at least one pair of stereoscopic optical paths. The first focusing lens is immediately neighboring the objective system and the second focusing lens is immediately neighboring the first focusing lens, along the optical axes of the at least on pair of stereoscopic optical paths. In other words, the at least one pair of stereoscopic optical paths enters the first focusing lens after exiting the objective lens. Furthermore, the at least one pair of stereoscopic optical paths enters the second focusing lens after exiting from the first focusing lens. In other words, the first focusing lens is arranged along the at least one pair of stereoscopic optical paths in between the objective system and the second focusing lens.

In this respect, the term "immediately neighboring" does not exclude the provision of optical elements having no optical refractive power or a relatively low optical refractive power in between the objective system and the two focusing lenses or in between the two focusing lenses. In this respect an optical element having relatively low optical refractive power is considered to be an optical element the optical refractive power of which is not higher than 30% and especially 20% and further especially 10% of the optical refractive power of each of the two focusing lenses in amount. Consequently, optical elements arranged along the optical axis of the at least one pair of stereoscopic optical paths having no optical refractive power or only a low optical refractive power, as defined above, such as plane filters, for example, shall not be considered regarding the feature "immediately neighboring."

The optical paths of each pair of stereoscopic optical paths can partially overlap in the first and/or second focusing lens or not overlap at all in the first and/or second focusing lens. The two focusing lenses respectively have an optical refractive power with a sign (positive or negative) that differs from one another. The amount of the optical refractive power of the two focusing lenses may be the same, apart from the sign. The optical refractive power can be a spherical optical refractive power. The at least one actuator is adapted to change a working distance of the stereoscopic microscope by manipulating at least one of these focusing lenses.

According to an embodiment the actuator is adapted to shift at least one focusing lens along the optical axis of this focusing lens to change the working distance, such that the manipulation of the at least one focusing lens is a shifting of the focusing lens. According to an embodiment this shift of the focusing lens causes a displacement of the two focusing lenses relative to one another. According to embodiments the working distance is provided by the two focusing lenses in combination with the objective lens. The first and second focusing lenses respectively can be either cemented lenses or basic lens elements. Thus, the distance of at least one focusing lens from the objective system measured along the optical axes of the stereoscopic optical paths is changed.

According to another embodiment the actuator is adapted to change the optical refractive power of the first focusing lens and/or to change the optical refractive power of the second focusing lens, such that the manipulation of the at least one focusing lens is a direct actuation (control) of the same, without changing the position of the first, respectively, second focusing lens. However, an additional shifting of one of these focusing lenses is not excluded. For example, the focusing lens can be a liquid lens or a liquid crystal lens. Such types of lenses can be bought from the company Varioptik, Bâtiment Tony Garnier, 24 rue Jean Baldassine, 69007 Lyon, France.

As the stereoscopic optical paths are pair-wise guided by common optical elements in the objective system and the focusing lenses, a tilting of the stereoscopic optical axes occurring during can be inherently compensated for.

According to an embodiment, the distance between the objective system and the focusing lens immediately neighboring the objective system along the at least one pair of stereoscopic optical paths measured along the optical axes of the at least one pair of stereoscopic optical paths is at least 25 mm and further at least 35 mm and further at least 45 mm. This is measured in between the beam exit point on the objective system (location where beams of optical paths exit from the last lens of the objective system) and the corresponding beam entrance points on the focusing lens immediately neighboring the objective system (location where beams of optical paths enter into the focusing lens immediately neighboring the objective system). According to an embodiment this distance is however smaller than 100 mm. Thus, the distance d between the objective system and the focusing lens immediately neighboring the objective system along the at least one pair of stereoscopic optical paths measured along the optical axes of the at least one pair of stereoscopic optical paths may be in the following ranges, for example: 25 mm≤d<100 mm, 35 mm≤d<100 mm and 45 mm≤d<100 mm.

According to an embodiment the focusing lens arranged first along the at least one pair of stereoscopic optical paths starting from the objective system has negative optical refractive power and the second focusing length following the first focusing lens along the at least one pair of stereoscopic optical paths has positive optical refractive power. According to an alternative embodiment the focusing lens arranged first along the at least one pair of stereoscopic optical paths starting from the objective system has positive optical refractive power and the second focusing length following the first focusing lens along the at least one pair of stereoscopic optical paths has negative optical refractive power.

According to an embodiment, the distance between the objective system and the focusing lens immediately neighboring the objective system along the at least one pair of stereoscopic optical paths measured along the optical axes of the at least one pair of stereoscopic optical paths is at least 0.5 times and further at least 0.75 times and further at least 1 time the free diameter of the objective system.

This distance between the objective system and the focusing lens immediately neighboring the objective system along the optical axes of the at least one pair of stereoscopic optical paths is high in comparison to the prior art, and provides for a simple arrangement of optical elements bending the at least one pair of stereoscopic optical paths (such as for example a mirror surface, a prism or a beam splitter) and at the same time make sure that a potential shifting of one focusing lens is not obstructed by the objective system.

According to an embodiment the stereoscopic microscope further comprises a pair of oculars or a camera adapter for a stereoscopic camera, which are arranged along the at least one pair of stereoscopic optical paths traversing the focusing lenses. In between the focusing lenses and the oculars or the camera adapter, respectively, only one imaging into an intermediate image occurs along the at least one pair of stereoscopic optical paths. The optical path in between the two immediately neighboring focusing lenses along the optical axes, respectively, is free of the imaging of an object placed in the object plane into an intermediate image. According to an embodiment the intermediate image of an object placed in the object plane is separated along the respective stereoscopic optical paths from the closest focusing lens at least by a single diameter of this focusing lens and especially by a double diameter of this focusing lens.

According to an embodiment the stereoscopic microscope further comprises optical elements for defining at least a first pair of stereoscopic optical paths which are allocated to a co-observer (assistant observer) and a second pair of stereoscopic optical paths, which are allocated to a main observer different from the co-observer. The objective system is traversed commonly by each of the (observation) optical paths of the first and second pairs of stereoscopic optical paths. In this respect the optical paths of each pair of stereoscopic optical paths can partially overlap in the objective system or even not overlap at all in the objective system. The two focusing lenses are traversed in sequence by each of the (observation) optical paths of only the first pair of stereoscopic optical paths, which are allocated to the co-observer. Thus the two focusing lenses are free of the second pair of stereoscopic optical paths which are allocated to the main observer. In this way, the focal plane of the second pair of stereoscopic optical paths allocated to a main observer is defined by the optical refractive power of the objective system, and the focal plane of the first pair of stereoscopic optical paths allocated to a co-observer is defined by the optical refractive power of the objective system in combination with the first and second focusing lenses. Thus, the focal plane of the first pair of stereoscopic optical paths can be adapted independently from the focal plane of the second pair of stereoscopic optical paths by using the actuator.

According to an embodiment the second pair of stereoscopic optical paths allocated to the main observer is free of shiftable lenses and/or optical elements of variable optical refractive power, which provide for a change of the working distance of the second pair of stereoscopic optical paths. The working distance of the second pair of stereoscopic optical paths is thus constant if the same objective lens is used. Consequently, the working distance of the second pair of stereoscopic optical paths allocated to the main observer exclusively is defined by the fixed focal length of the focal lens. However, this does not exclude that the second pair of stereoscopic optical paths allocated to the main observer contains a pair of oculars having a diopter adaptation and/or a camera adapter and/or a magnification changer for continuous or incremental adaptation of the magnification (for such as a zoom system or a magnification changer).

According to an embodiment the first pair of stereoscopic optical paths allocated to the co-observer is free of effective refractive optical elements along the optical axis of the first pair of stereoscopic optical paths in between the focusing lenses and the objective system, which effective refractive optical elements change the working distance. Thus, the working distance of the first pair of optical paths allocated to the co-observer exclusively is defined by the combined action of the objective system having a constant focal length and the focusing lenses. In this respect, effective refractive optical elements are considered to be elements by the addition or removal of which a working distance of the stereoscopic microscope is changed by more than 0.5% and especially by more than 1% and further especially by more than 2% and further especially more than 5%. This does not exclude that optical filters and/or mirror surfaces and/or glass covers are arranged along the optical axes of the first pair of stereoscopic optical paths.

According to an embodiment at least one mirror surface bending the first pair of stereoscopic optical paths is located along the optical axes of the first pair of stereoscopic optical paths in between the focusing lenses of the first pair of stereoscopic optical paths allocated to the co-observer. This mirror surface, for example, can be part of a plain optical mirror, part of an optical beam splitter, and/or part of a prism.

According to an embodiment the first pair of stereoscopic optical paths allocated to the co-observer and/or the second pair of stereoscopic optical paths allocated to the main observer further comprises at least one camera adapter and/or a pair of oculars as well as optical elements arranged in between the camera adapter or the pair of oculars, respectively, and the respective focusing lenses. These optical elements provide for a variable magnification of the object to be observed and are respectively traversed separately by the stereoscopic optical paths.

According to an embodiment the actuator comprises either a manually activated gear (for example comprising a hand wheel driving the gear) or an electric drive having a control for controlling the drive for shifting the at least one focusing lens along the optical axes of the at least one pair of stereoscopic optical paths.

According to an alternative embodiment the first and/or second focusing lens has a variable optical refractive power. In this case the actuator is a control for controlling the variable optical refractive power of this first and/or second focusing lens.

According to an embodiment the first focusing lens following the objective system along the optical axes of the at least one pair of stereoscopic optical paths starting for the objective system is stationary (fixed). Furthermore, this focusing lens has a non-variable optical refractive power if considered on its own. In this case, the second focusing lens that is arranged along the optical axes of the at least one pair of stereoscopic optical paths starting from the objective system can either be shifted along the optical axis of the at least one pair of stereoscopic optical paths by using an actuator or the second focusing lens that is arranged along the optical axes of the at least one pair of stereoscopic optical paths starting from the objective system has a variable optical refractive power that can be adapted by using the actuator. As a further alternative, it is possible to additionally shift a focusing lens having variable optical refractive power along the optical axes of the at least one pair of stereoscopic optical paths by using an actuator.

According to an embodiment the objective system and the first focusing lens and the second focusing lens that are following the objective system along the optical axes of the at least one pair of stereoscopic optical paths are configured such that pupil planes of the pupil of the microscope (in contrast to the pupil of an observer's eye) of the at least one pair of stereoscopic optical paths are separated from a mirror surface bending the at least one pair of stereoscopic optical paths by a distance along the optical axis of the at least one pair of stereoscopic optical paths, which distance is smaller than 1.5 times and especially smaller than 1 times and further especially smaller than 0.5 times a free diameter of the objective system. In this respect a pupil plane of the pupil of the microscope is understood to be the curved or plane surface in which the principal rays (chief rays) of the beam bundles guided by the stereoscopic optical paths of the at least one pair of stereoscopic optical paths intersect. The arrangement of the pupils in the region of a mirror surface bending the stereoscopic optical path of the at least one pair of stereoscopic optical paths provides for a compact design of the mirror surface.

According to an embodiment the objective system comprises a carrier which provides for a selective arrangement of different objective systems having different focal lengths. For example, objective systems having focal lengths of 175 mm . . . 225 mm, respectively, may selectively be used in the stereoscopic microscope. The carrier can be provided in addition to a mount of the objective system or can be integrated into the mount of the objective system.

The features described above are only facultative and can be selectively combined with one another.

It is further emphasized that in the description and the claims the terms "comprise", "have", "contain", "include" and "with" as well as their grammatical modifications are not considered to be complete listing of features, such as method steps, components, ranges, measures, and so on and thus should not prevent the presence of additional or alternative features or groups of alternative and additional features.

BRIEF DESCRIPTION OF THE DRAWINGS

The foregoing as well as other advantageous features of the disclosure will be more apparent from the following detailed description of exemplary embodiments with reference to the accompanying drawings. It is noted that not all possible embodiments necessarily exhibit each and every, or any, of the advantages identified herein.

Same or like elements in the figures are denoted by the same or like reference signs. It is emphasized that the disclosure is not restricted to the described embodiments but is only defined by the scope of the claims. Embodiments according to the disclosure may comprise a different number and combination of features than used in the following examples. When describing an embodiment of the disclosure reference is made to the following figures:

DETAILED DESCRIPTION OF EXEMPLARY EMBODIMENTS

Figure 1A:
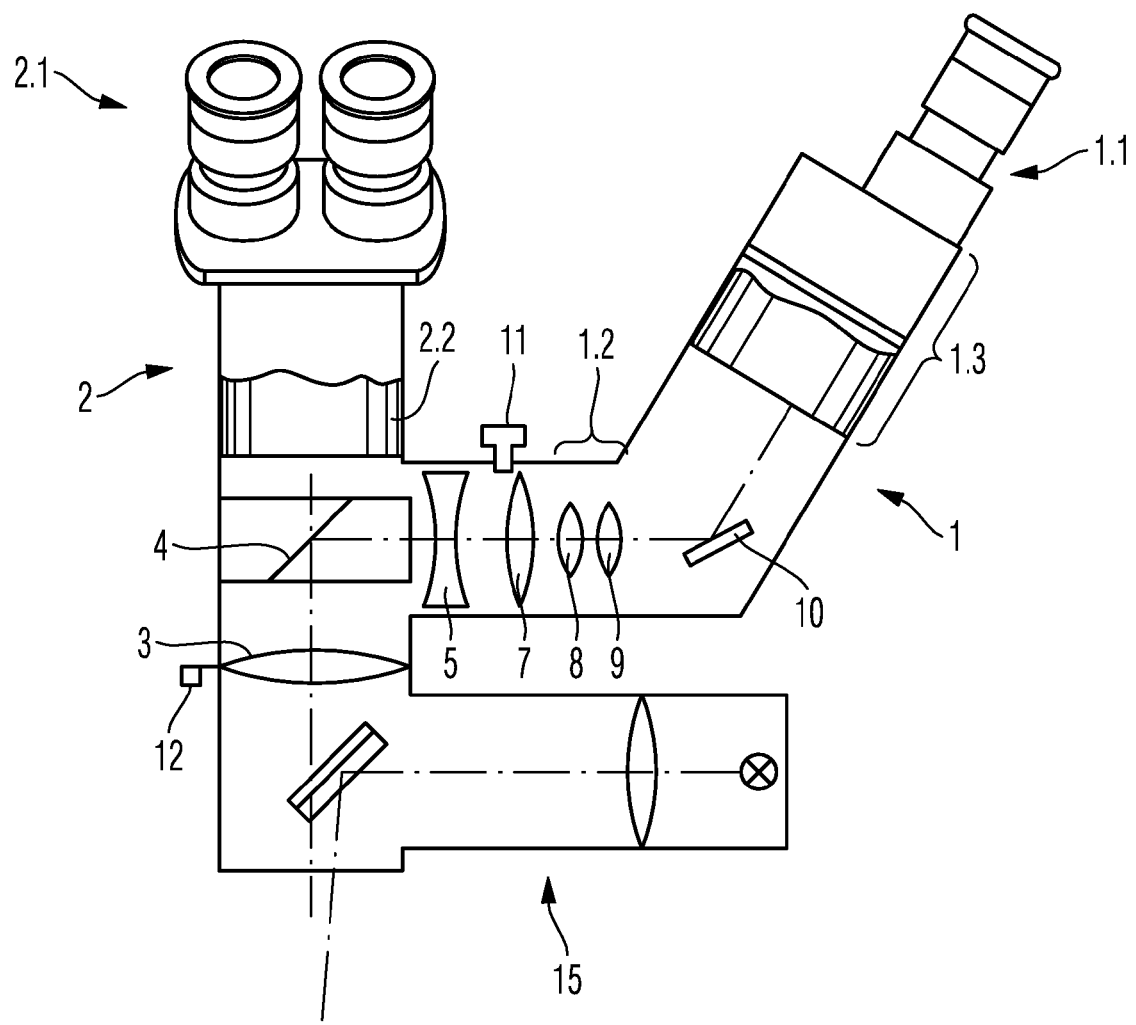
FIG. 1A is a schematic side view of a stereoscopic microscope according to a first embodiment.

In the exemplary embodiments described below, components that are alike in function and structure are designated as far as possible by like reference numerals. Therefore, to understand the features of the individual components of a specific embodiment, the descriptions of other embodiments and of the summary of the disclosure should be referred to.

Figure 1B:
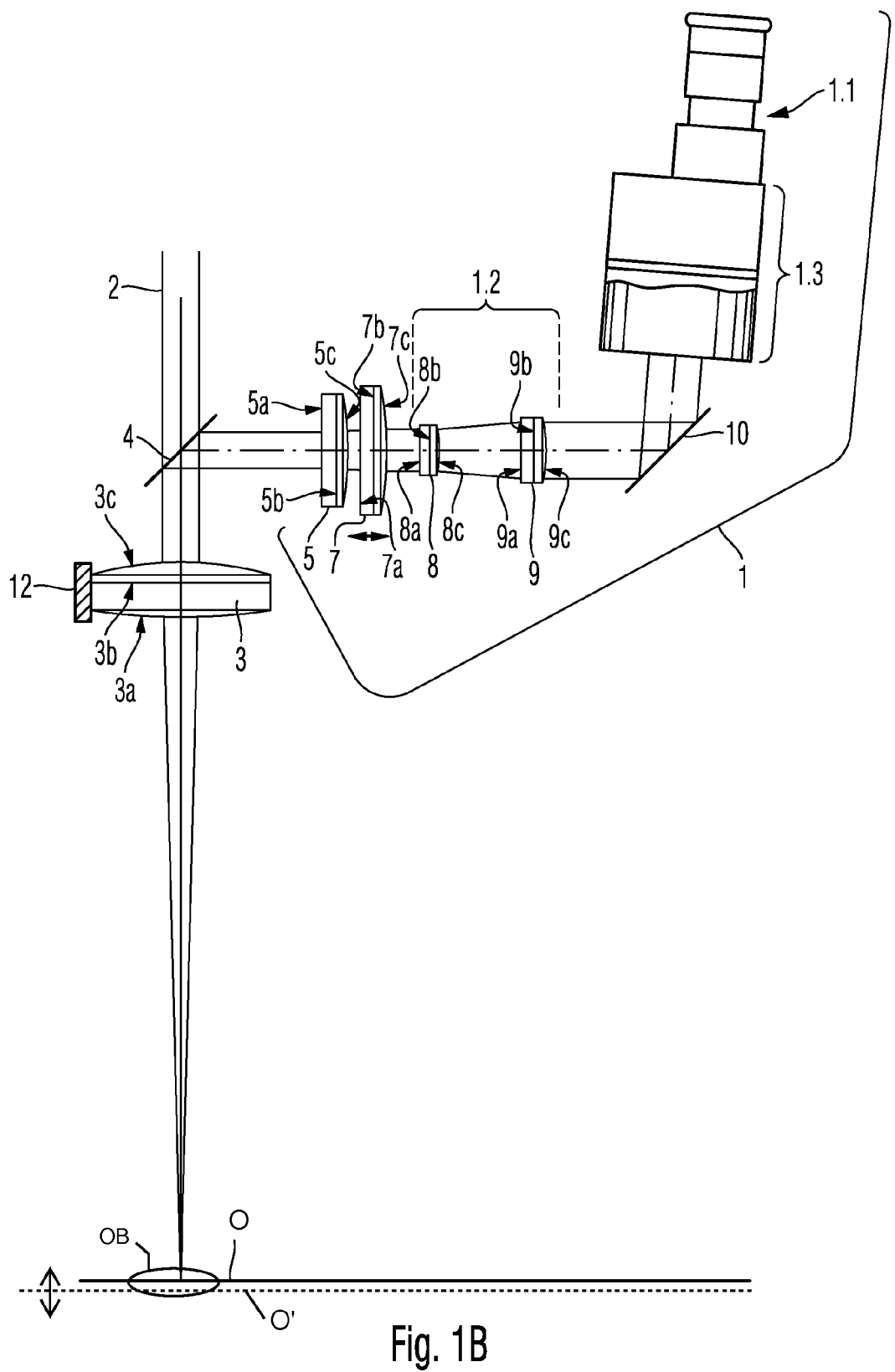
FIG. 1B is a schematic view of the individual optical elements of an optical path allocated to a co-observer of the surgical microscope of FIG. 1A.
Figure 1C:
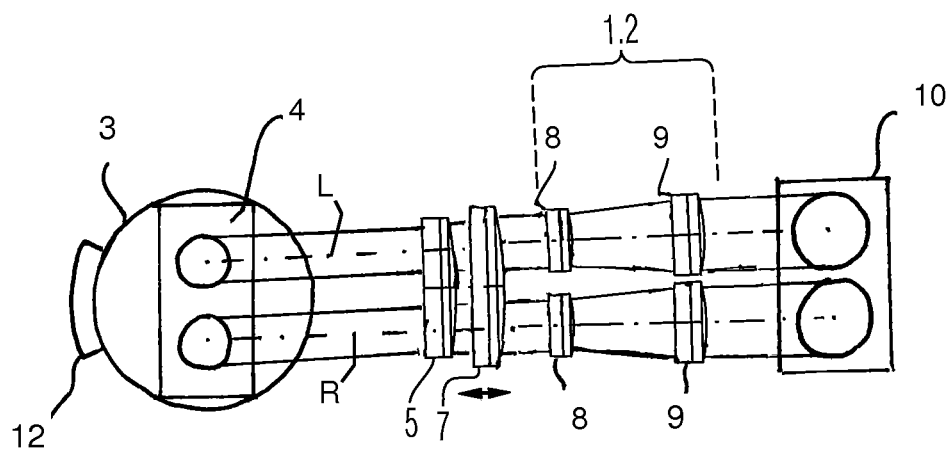
FIG. 1C is a schematic top view on selected optical elements of FIG. 1B.

A first embodiment using a stereoscopic microscope having a main observer tube and a co-observer tube which are optically coupled with one another will be described by reference to FIGS. 1A and 1B. For reasons of clarity only one of the two stereoscopic optical paths allocated to each a main observer (e.g. a surgeon) and a co-observer (e.g. a physician assistant) are shown in FIGS. 1A and 1B. However, the top view of FIG. 1C shows both stereoscopic paths L, R of each the main observer and the co-observer.

The two pairs of stereoscopic observation optical paths arriving from an object OB commonly traverse an objective lens 3 having a constant refractive power and thus constant focal length, and are bent and separated, respectively, by a mirror surface 4 of a beam splitter in the direction of observation tubes 2.1 of a main observer and co-observer, respectively.

Due to the absence of further focusing lenses in the optical paths allocated to the main observer the constant focal length of the objective lens 3 defines an object plane O of the main observer (focal plane of main observer). The objective lens 3 is held by a carrier 12 which provides for easy exchanging of the objective lens 3, to allow selective usage of objective lenses having different refractive powers and thus different focal lengths. The carrier 12 is provided in addition to a mount of objective lens 3, which mount is not shown in the figure. By changing the distance of the stereoscopic microscope as a whole with respect to the object OB the object plane O is adjusted. However, the present disclosure is not restricted to an objective system having a constant focal length. In fact, even objective systems having variable focal lengths can be used.

A magnification changer 2.2, 1.2 is respectively arranged in between ocular tubes 2.1, 1.2 of the main observer tube 2 and the co-observer tube 1 and the mirror surface 4. The magnification changer 2.2, 1.2 selectively provides for an independently adjustable magnification for the main observer and the co-observer. In the shown embodiment the magnification changers 1.2, 2.2 each are of the Galileo type. The basic optical lenses or cemented lenses, respectively, used for the Galileo changers each are traversed by only one of the two stereoscopic optical paths of the main and co-observer, respectively. This is shown best in FIG. 1C for the magnification changer 1.2 of the co-observer tube 1. In FIG. 1C, the stereoscopic paths of the main observer are not bent by the beam splitter 4. Thus, the stereoscopic optical paths are separately guided by the optical lenses of the magnification changers 1.2, 2.2, which means that the stereoscopic optical paths do not traverse common basic optical lenses or cemented lenses, respectively, of the magnification changers 1.2, 2.2. For sake of clarity only the optical lenses 8, 9 of the Galileo changer 1.2 of one of the two stereoscopic optical paths of the co-observer tube 1 is shown in FIGS. 1A and 1B.

A magnified two dimensional image of the object OB placed in the object plane O is provided at the exit of each ocular tube 2.1, 1.1.

For sake of clarity the ocular tubes 2.1, 1.1 and the magnification changer 2.2 of the main observer tube 2 are not shown in FIG. 1C.

Two focusing lenses 5, 7 are provided along the optical axes of the stereoscopic optical paths L, R in between the objective lens 3 having a constant focal length and the Galileo changer 1.2 of the co-observer tube 1. Each focusing lens 5, 7 is a cemented lens. The two stereoscopic optical paths L, R of the co-observer tube 1 are commonly guided by the focusing lenses 5, 7. The two stereoscopic optical paths L, R of the co-observer tube 1 in between the two focusing lenses 5, 7 and the objective lens 3 are free of further effective refractive optical elements. Together with the objective lens 3, the two focusing lenses 5, 7 define an object plane O' of the co-observer (focal plane of co-observer) that is essentially independent from the object plane O of the main observer and thus can be located at a focal plane different from the focal plane (and thus object plane O) of the main observer. Thus, the main-observer and the co-observer can observe different object planes/focal planes of the same object OB at the same time.

The second focusing lens 7 along the optical axes of the stereoscopic optical paths L,R starting from the object lens 3 can be shifted along the optical axes of the stereoscopic optical paths L, R of the co-observer tube 1 by using an actuator 11 having a hand wheel and a gear to adapt the position of the object plane O' allocated to the co-observer. The first focusing lens 5 along the optical axes of the stereoscopic optical paths L, R starting from the objective lens 3 is stationary.

In the shown embodiment the distance between the objective lens 3 and the focusing lens 5 immediately neighboring the objective lens 3 along the optical axes of the stereoscopic optical paths L, R of the co-observer tube 1 measured along the optical axes of the stereoscopic optical paths L, R of the co-observer tube 1 amounts to 55 mm, being 1.1 times the free diameter of the objective lens 3. This is measured from the beam exit point on the objective lens 3 (location where the beam exits from the objective lens 3) to the beam entrance point of the focusing lens 5 (location where the beam enters the focusing lens 5). In this respect the terms "immediately neighboring" and "immediately following", respectively, do not preclude that additional optical elements are located in between the objective lens 3 and the two focusing lenses 5, 7 or even in between the two focusing lenses 5, 7, which optical elements have no or only a relatively small optical refractive power. In this respect optical elements having a relatively low optical refractive power are considered to be optical elements, the optical refractive power of which does not exceed 30% and especially 20% and further especially 10% of the amount of optical refractive power of each of the two focusing lenses 5, 7. Consequently, optical elements having no optical refractive power such as, for example, plain filters, or optical elements having only a very low optical refractive power that are arranged along the optical axes of the at least one pair of stereoscopic optical paths should be tolerated regarding the feature of "immediately neighboring" and "immediately following", respectively.

The first focusing lens 5 immediately following the objective lens 3 along the stereoscopic optical paths L, R of the co-observer tube 1 has a negative optical refractive power in the shown embodiment and thus is a diverging lens. In the shown embodiment the diverging lens is a plan concave lens. Alternatively, a bi-concave or a convex-concave lens may be used, which lens may even be a cemented lens. The second focusing lens 7 immediately following the first focusing lens 5 along the optical axes of the stereoscopic optical paths L, R of the co-observer tube 1 has a positive optical refractive power in the shown embodiment and thus is a converging lens. In the shown embodiment the converging lens is a bi-convex lens. Alternatively, a plain-convex or a concave-convex lens may be used, which lens may even be a cemented lens.

According to an alternative embodiment the second focusing lens 7 is not shiftable along the optical axes of the stereoscopic optical paths L, R of the co-observer tube 1, but is a liquid lens and thus has a variable optical refractive power. Accordingly the actuator 11 is a control adapted to control the liquid lens in this alternative embodiment.

The object plane O is located in the focal length of the objective lens 3 and is imaged to infinity by the objective lens 3.

The two focusing lenses 5, 7 in combination cause an imaging to infinity and thus provide an afocal interface at a side along the optical paths of the stereoscopic microscope opposite to the side where the objective lens 3 is located.

The main observer tube 2 is free of displaceable lenses and optical elements having variable optical refractive power, which provide for a change of the working distance.

Starting from the magnification changer 1.2 the two stereoscopic optical paths of the co-observer tube 1 are guided by a further mirror surface 10 and a bending system 1.3 comprising a field lens to the ocular tube 1.1. For sake of clarity the bending system 1.3 is not shown in FIG. 1C.

Only one single imaging of the object OB placed in the object plane O' into an intermediate image is performed along the at least one pair of stereoscopic optical paths L, R of the co-observer tube 1 in-between the objective lens 3 and the ocular tube 1.1 in each of the two stereoscopic optical paths. The optical path in-between the two immediately neighboring focusing lenses 5, 7, respectively, is free of an imaging of the object OB placed in the object plane O' in an intermediate image.

The imaging of the object OB placed in the object plane O' into an intermediate image is separated from the closest focusing lens 7 along the respective stereoscopic optical path in the shown embodiment by three times the diameter of this focusing lens 7 and thus is located inside the bending system 1.3 bending the optical paths L, R of the co-observer tube 1.

FIG. 1A further shows an illumination arrangement 15 which provides for illuminating the object planes O, O'.

For sake of clarity the actuator 11 manipulating the second focusing lens 7 is not shown in FIG. 1B. In FIG. 1B the optically effective surfaces 3a, 3b, 3c, 5a, 5b, 5c, 7a, 7b, 7c, 8a, 8b, 8c, 9a, 9b, 9c of the shown optical lenses 3, 5, 7, 8 and 9 are provided with reference signs.

Figure 2:
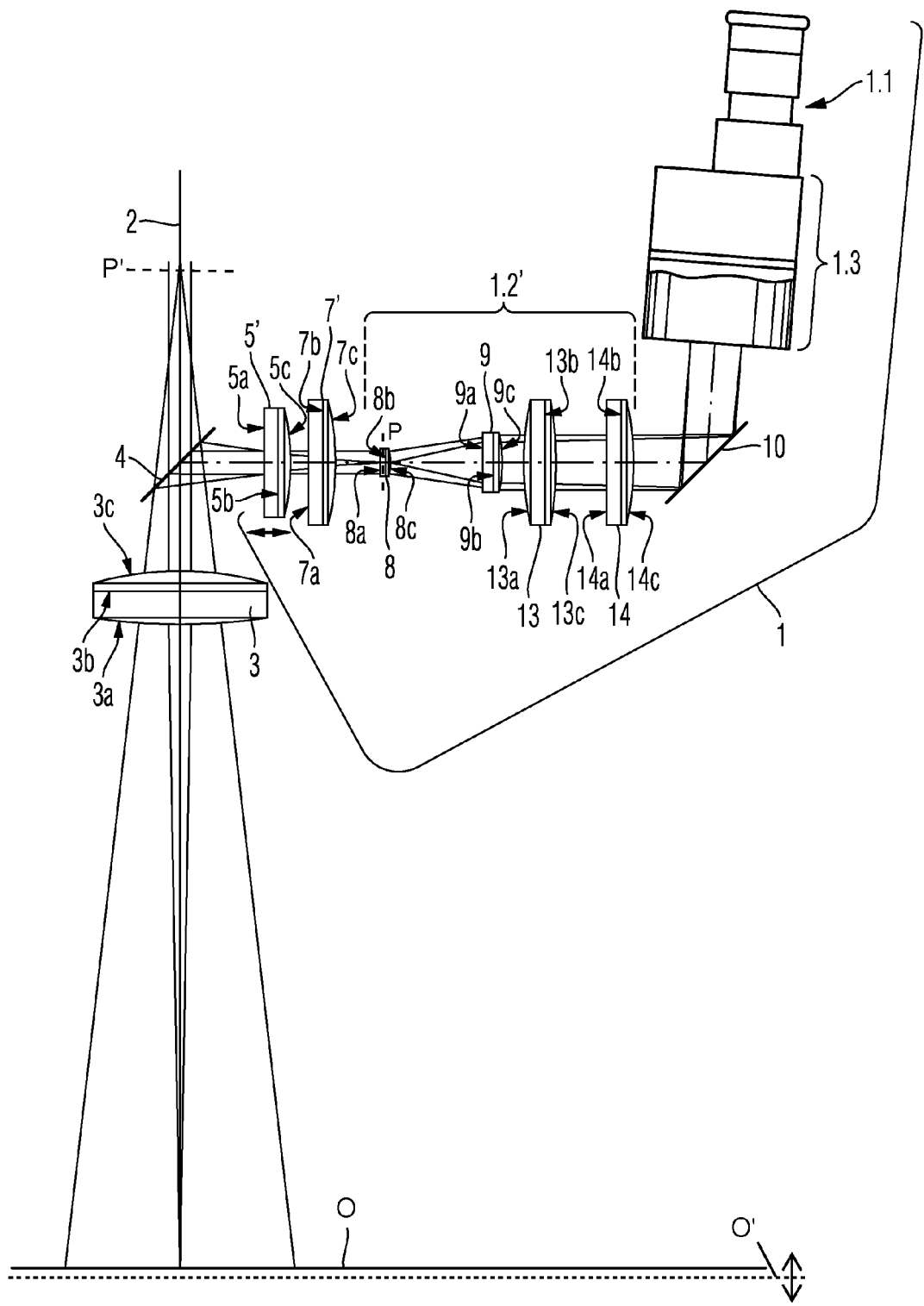
FIG. 2 is a schematic view of the individual optical elements of the optical path allocated to a co-observer of the stereoscopic microscope according to a second embodiment.

FIG. 2 shows a schematic view of the optical elements of the stereoscopic co-observer optical paths of a stereoscopic microscope according to a second embodiment. As the second embodiment is very similar to the first embodiment described above, only differences are described in the following, and in general reference is made to the description of the first embodiment given above.

The second embodiment shown in FIG. 2 differs from the first embodiment described above in the optical parameters of the individual optical elements and in the construction of the magnification changer 1.2. In the shown embodiments the modification changer 1.2 comprises in addition to the lenses 8 and 9 of a zoom system being a magnification changer of the Galileo type two lenses 13 and 14 which provide for an additional magnification.

Furthermore, in the second embodiment shown in FIG. 2 the first focusing lens 5' immediately following the objective lens 3 along the optical axes of the stereoscopic optical paths of the co-observer tube 1 has a positive optical refractive power and thus is a converging lens having at least one convex surface. The second focusing lens 7' immediately following the first focusing lens 5' along the optical axis of the stereoscopic optical paths of the co-observer tube 1 has a negative optical refractive power in the shown embodiment and thus is a diverging lens having at least one concave surface.

Furthermore, the first focusing lens 5' is shiftable by using an actuator (not shown in FIG. 2) and the second focusing lens 7' is stationary in the second embodiment shown in FIG. 2.

In the second embodiment no imaging of the object placed in the object plane O' into an intermediate image is performed along the at least one pair of stereoscopic optical paths of the co-observer tube 1 in-between the focusing lenses 5', 7' as well.

However, the present disclosure is not restricted to the first and second focusing lenses 5', 7' described above. Especially, the focusing lenses 5' and 7' may be provided in the same way as in the first embodiment.

In FIG. 2, the pupil plane P allocated to the co-observer tube 1 and the pupil plane P' allocated to the main observer tube 2 are shown.

Figure 3:
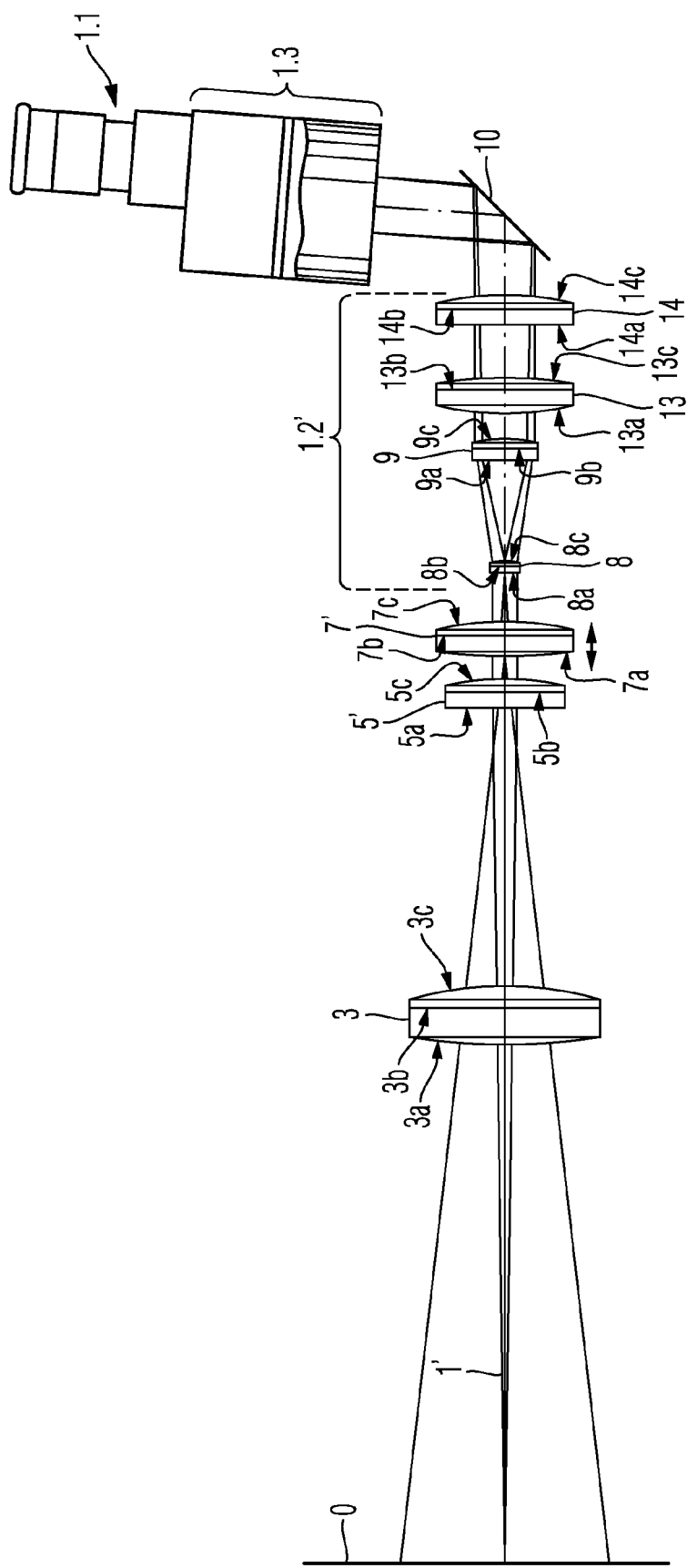
FIG. 3 is a schematic view of the individual optical elements of the observer optical path of the stereoscopic microscope according to a third embodiment.
Figure 4:
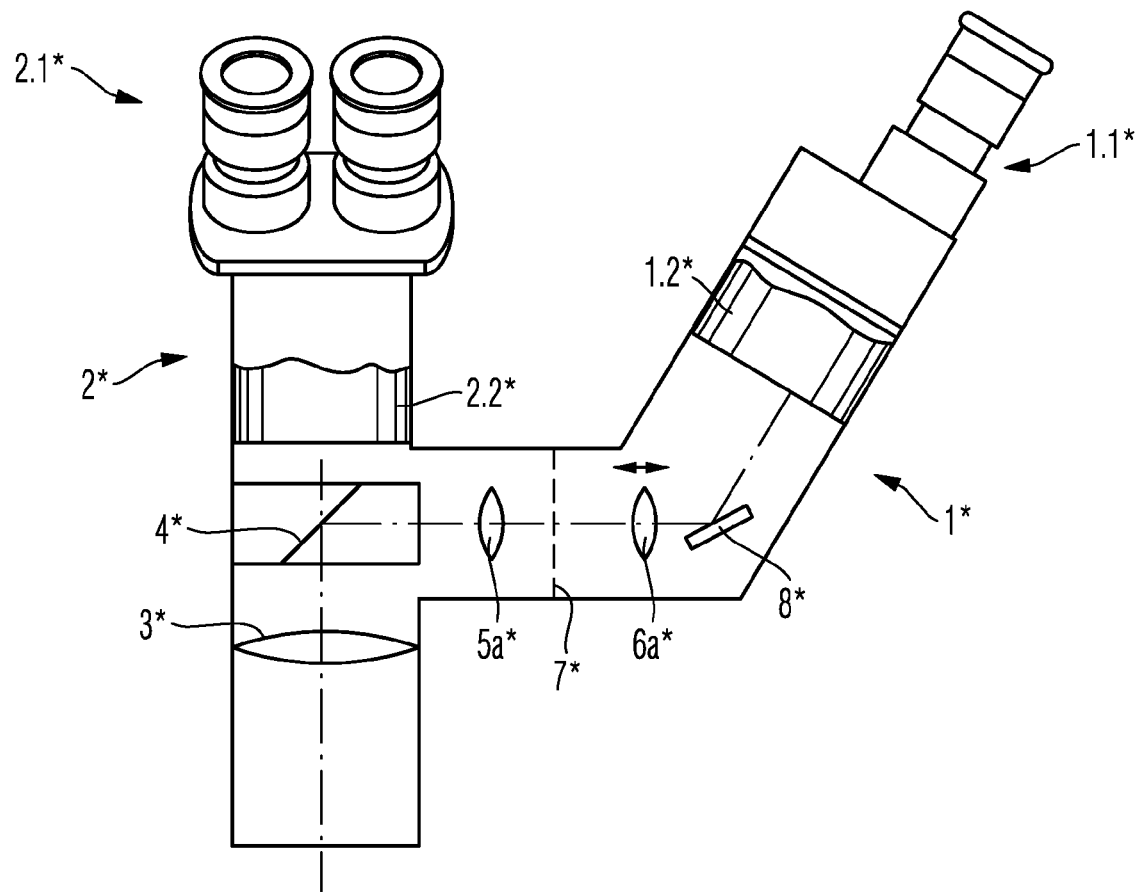
FIG. 4 is a schematic side view of a surgical microscope according to the prior art.

The third embodiment shown in FIG. 3 differs from the second embodiment described above only in that only one pair of observation optical paths 1' is provided. Thus, this embodiment does not distinguish between main observer tube and co-observer tube. Furthermore, no bending element for bending the imaging optical paths 1' is provided in between the objective lens 3 and the focusing lens 5', 7' along the optical axes of the single pair of imaging optical paths 1' in this embodiment.

It is emphasized that the embodiments above are only exemplary. Furthermore the details of the embodiments described above can be combined with each other in any order.

While the disclosure has been described with respect to certain exemplary embodiments thereof, it is evident that many alternatives, modifications and variations will be apparent to those skilled in the art. Accordingly, the exemplary embodiments of the disclosure set forth herein are intended to be illustrative and not limiting in any way. Various changes may be made without departing from the spirit and scope of the present disclosure as defined in the following claims.

What is claimed is:

1. A stereoscopic microscope having a first pair of stereoscopic optical paths allocated to a co-observer, and a second pair of stereoscopic optical paths allocated to a main observer, comprising:
    an objective system commonly traversed by each optical path of the first and second pairs of stereoscopic optical paths;
    a first focusing lens having a first optical refractive power and a second focusing lens having a second optical refractive power, the first and second focusing lenses, respectively, being separate elements commonly traversed by only the first pair of stereoscopic optical paths; and
    at least one actuator, the actuator being adapted to shift at least one of the focusing lenses along the optical axes of the first pair of stereoscopic optical paths for varying a working distance of the stereoscopic microscope;
    wherein the first focusing lens is immediately neighboring the objective system along the optical axes of the first pair of stereoscopic optical paths, and
    wherein the first optical refractive power of the first focusing lens and the second optical refractive power of the second focusing lens have different signs.

2. The stereoscopic microscope according to claim 1, wherein at least one of the following conditions is fulfilled:
    the distance between the objective system and the first focusing lens immediately neighboring the objective system along the first pair of stereoscopic optical paths measured along the optical axes of the first pair of stereoscopic optical paths is at least 25 mm;
    the distance between the objective system and the first focusing lens immediately neighboring the objective system along the first pair of stereoscopic optical paths measured along the optical axes of the at least one pair of stereoscopic optical paths amounts to 0.5 times the free diameter of the objective system.

3. The stereoscopic microscope according to claim 1, wherein no imaging into an intermediate image is performed along the at least one pair of stereoscopic optical paths in between the first and second focusing lenses.

4. The stereoscopic microscope according to claim 1, wherein the second pair of stereoscopic optical paths allocated to the main observer is free of shiftable optical lenses and optical elements having variable optical refractive power, which provide for an adaptation of the working distance.

5. The stereoscopic microscope according to claim 1, wherein at least one mirror surface bending the first pair of stereoscopic optical paths is provided along the optical axes of the first pair of stereoscopic optical paths in-between the first focusing lens of the first pair of stereoscopic optical paths allocated to the co-observer and the objective system.

6. The stereoscopic microscope according to claim 1, wherein the first focusing lens following the objective system along the optical axes of the first pair of stereoscopic optical paths starting from the objective system is stationary and has a constant optical refractive power, and
    the second focusing lens following the objective system along the optical axes of the first pair of stereoscopic optical paths starting from the objective system is shiftable along the optical axes of the first pair of stereoscopic optical paths by means of an actuator.

7. The stereoscopic microscope according to claim 1, further including a mirror surface bending the first pair of stereoscopic optical paths, wherein the first focusing lens and the second focusing lens follow the objective system along the optical axes of the first pair of stereoscopic optical paths and wherein the objective system and the first focusing lens and the second focusing lens are configured such that pupil planes of the stereoscopic optical paths are separated from the mirror surface along the optical axes of the first pair of stereoscopic optical paths by a distance smaller than 1.5 times a free diameter of the objective system.

8. The stereoscopic microscope according claim 1, wherein the objective system has a carrier which provides for a selective usage of objective systems having different constant focal lengths.

9. A stereoscopic microscope having at least one pair of stereoscopic optical paths, comprising:
    an objective system commonly traversed by each optical path of the at least one pair of stereoscopic optical paths;
    a first focusing lens having a first optical refractive power and a second focusing lens having a second optical refractive power, the first and second focusing lenses, respectively, being separate elements commonly traversed by the at least one pair of stereoscopic optical paths; and at least one actuator, the actuator being adapted to shift at least one of the focusing lenses along the optical axes of the at least one pair of stereoscopic optical paths for varying a working distance of the stereoscopic microscope;

wherein the first focusing lens is immediately neighboring the objective system along the optical axes of the at least one pair of stereoscopic optical paths, and wherein the first optical refractive power of the first focusing lens and the second optical refractive power of the second focusing lens have different signs.

10. The stereoscopic microscope according to claim 9, wherein at least one of the following conditions is fulfilled:

the distance between the objective system and the first focusing lens immediately neighboring the objective system along the at least one pair of stereoscopic optical paths measured along the optical axes of the at least one pair of stereoscopic optical paths is at least 25 mm;

the distance between the objective system and the first focusing lens immediately neighboring the objective system along the at least one pair of stereoscopic optical paths measured along the optical axes of the at least one pair of stereoscopic optical paths amounts to 0.5 times the free diameter of the objective system.

11. The stereoscopic microscope according to claim 9, wherein no imaging into an intermediate image is performed along the at least one pair of stereoscopic optical paths in between the first and second focusing lenses.

12. The stereoscopic microscope according to claim 9, having a first pair of stereoscopic optical paths allocated to a co-observer, and a second pair of stereoscopic optical paths allocated to a main observer, wherein the objective system is commonly traversed by the first and second pairs of stereoscopic optical paths; and wherein the two first and second focusing lenses, respectively, are traversed in sequence by only the first pair of stereoscopic optical paths.

13. The stereoscopic microscope according to claim 12, wherein the second pair of stereoscopic optical paths allocated to the main observer is free of shiftable optical lenses and optical elements having variable optical refractive power, which provide for an adaptation of the working distance.

14. The stereoscopic microscope according to claim 12, wherein at least one mirror surface bending the first pair of stereoscopic optical paths is provided along the optical axes of the first pair of stereoscopic optical paths in-between the first focusing lens of the first pair of stereoscopic optical paths allocated to the co-observer and the objective system.

15. The stereoscopic microscope according to claim 9, wherein the first focusing lens following the objective system along the optical axes of the at least one pair of stereoscopic optical paths starting from the objective system is stationary and has a constant optical refractive power, and the second focusing lens following the objective system along the optical axes of the at least one pair of stereoscopic optical paths starting from the objective system is shiftable along the optical axes of the at least one pair of stereoscopic optical paths by means of an actuator.

16. The stereoscopic microscope according to claim 9, further including a mirror surface bending the at least one pair of stereoscopic optical paths, wherein the first focusing lens and the second focusing lens follow the objective system along the optical axes of the at least one pair of stereoscopic optical paths and wherein the objective system and the first focusing lens and the second focusing lens are configured such that pupil planes of the stereoscopic optical paths are separated from the mirror surface along the optical axes of the at least one pair of stereoscopic optical paths by a distance smaller than 1.5 times a free diameter of the objective system.

17. The stereoscopic microscope according to claim 9, wherein the objective system has a carrier which provides for a selective usage of objective systems having different constant focal lengths.

18. A stereoscopic microscope having at least one pair of stereoscopic optical paths, comprising:

an objective system commonly traversed by each optical path of the at least one pair of stereoscopic optical paths;

a first focusing lens having a first optical refractive power and a second focusing lens having a second optical refractive power, the first and second focusing lenses, respectively, being separate elements commonly traversed by the at least one pair of stereoscopic optical paths; and at least one actuator, the actuator being adapted to vary an optical refractive power of at least one of these focusing lenses for varying a working distance of the stereoscopic microscope;

wherein the first focusing lens is immediately neighboring the objective system along the optical axes of the at least one pair of stereoscopic optical paths, and wherein the first optical refractive power of the first focusing lens and the second optical refractive power of the second focusing lens have different signs.

19. The stereoscopic microscope according to claim 18, wherein at least one of the following conditions is fulfilled:

the distance between the objective system and the first focusing lens immediately neighboring the objective system along the at least one pair of stereoscopic optical paths measured along the optical axes of the at least one pair of stereoscopic optical paths is at least 25 mm; and the distance between the objective system and the first focusing lens immediately neighboring the objective system along the at least one pair of stereoscopic optical paths measured along the optical axes of the at least one pair of stereoscopic optical paths amounts to 0.5 times the free diameter of the objective system.

20. The stereoscopic microscope according to claim 18, wherein no imaging into an intermediate image is performed along the at least one pair of stereoscopic optical paths in between the first and second focusing lenses.

21. The stereoscopic microscope according to claim 18, having a first pair of stereoscopic optical paths allocated to a co-observer, and a second pair of stereoscopic optical paths allocated to a main observer, wherein the objective system is commonly traversed by the first and second pairs of stereoscopic optical paths; and wherein the two first and second focusing lenses, respectively, are traversed in sequence by only the first pair of stereoscopic optical paths.

22. The stereoscopic microscope according to claim 21, wherein the second pair of stereoscopic optical paths allocated to the main observer is free of shiftable optical lenses and optical elements having variable optical refractive power, which provide for an adaptation of the working distance.

23. The stereoscopic microscope according to claim 21, wherein at least one mirror surface bending the first pair of stereoscopic optical paths is provided along the optical axes of the first pair of stereoscopic optical paths in-between the first focusing lens of the first pair of stereoscopic optical paths allocated to the co-observer and the objective system.

24. The stereoscopic microscope according to claim 18, wherein the first focusing lens following the objective system along the optical axes of the at least one pair of stereoscopic optical paths starting from the objective system is stationary and has a constant optical refractive power, and the second focusing lens following the objective system along the optical axes of the at least one pair of stereoscopic optical paths starting from the objective system has a variable optical refractive power that can be changed by means of the actuator.

25. The stereoscopic microscope according to claim 18, further including a mirror surface bending the at least one pair of stereoscopic optical paths, wherein the first focusing lens and the second focusing lens follow the objective system along the optical axes of the at least one pair of stereoscopic optical paths and wherein the objective system and the first focusing lens and the second focusing lens are configured such that pupil planes of the stereoscopic optical paths are separated from the mirror surface along the optical axes of the at least one pair of stereoscopic optical paths by a distance smaller than 1.5 times a free diameter of the objective system.

26. The stereoscopic microscope according to claim 18, wherein the objective system has a carrier which provides for a selective usage of objective systems having different constant focal lengths.

27. The stereoscopic microscope according to claim 1, wherein the first pair of stereoscopic optical paths allocated to the co-observer in between the first focusing lens and the objective system along the optical axes of the first pair of stereoscopic optical paths is free of effective refractive optical elements.

28. The stereoscopic microscope according to claim 12, wherein the first pair of stereoscopic optical paths allocated to the co-observer in between the first focusing lens and the objective system along the optical axes of the first pair of stereoscopic optical paths is free of effective refractive optical elements.

29. The stereoscopic microscope according to claim 21, wherein the first pair of stereoscopic optical paths allocated to the co-observer in between the first focusing lens and the objective system along the optical axes of the first pair of stereoscopic optical paths is free of effective refractive optical elements.

* * * * *